(12) United States Patent
Hashida (10) Patent No.: US 6,687,610 B2
(45) Date of Patent: *Feb. 3, 2004

(54) NAVIGATION APPARATUS, NAVIGATION METHOD AND INFORMATION RECORDING MEDIUM CONTAINING NAVIGATION PROGRAM READABLE BY COMPUTER

(75) Inventor: Masaya Hashida, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/289,335

(22) Filed: Nov. 7, 2002

(65) Prior Publication Data

US 2003/0055556 A1 Mar. 20, 2003

Related U.S. Application Data

(63) Continuation of application No. 09/843,151, filed on Apr. 27, 2001, now Pat. No. 6,498,983.

(30) Foreign Application Priority Data

Apr. 28, 2000 (JP) .................................. P2000-131639

(51) Int. Cl.⁷ .............................................. G01C 21/30
(52) U.S. Cl. .................... 701/207; 701/211; 701/214; 340/995.17; 340/995.24
(58) Field of Search ........................ 701/28, 207, 208, 701/212, 214, 211; 340/988, 990, 995, 995.1, 995.17, 995.24, 995.25, 995.27; 342/357.01, 357.02, 357.07, 357.13

(56) References Cited

U.S. PATENT DOCUMENTS

| 3,696,384 A | 10/1972 | Lester |
| 5,455,851 A | 10/1995 | Chaco et al. |
| 5,955,973 A | 9/1999 | Anderson |
| 5,999,879 A | 12/1999 | Yano |
| 6,092,010 A | 7/2000 | Alofs et al. |
| 6,282,493 B1 | 8/2001 | Kitagawa et al. |

*Primary Examiner*—Tan Q. Nguyen
(74) *Attorney, Agent, or Firm*—Nixon & Vanderhye P.C.

(57) ABSTRACT

There is provided a navigation apparatus capable of executing a guide corresponding to an inside structure of a building which even if a vehicle is running in the building. The apparatus determines whether or not a current position of the vehicle is located in the building. If it is determined that the current position is located in the building, a plan view of the building is displayed. Then, the displayed plan view is used to carry out a navigation process.

12 Claims, 9 Drawing Sheets

NAVIGATION APPARATUS, NAVIGATION METHOD AND INFORMATION RECORDING MEDIUM CONTAINING NAVIGATION PROGRAM READABLE BY COMPUTER

This is a continuation of application Ser. No. 09/843,151 filed Apr. 27, 2001 now U.S. Pat. No. 6,498,983.

BACKGROUND OF THE INVENTION

1. Field of the Invention

The present invention relates to a navigation apparatus and an information record medium for recording a navigation program that can be read by a computer, and more particularly relates to a navigation apparatus for guiding routes where a movable body such as a vehicle travels while displaying a map or a drawing based on it and an information recording medium containing a navigation program readable by a computer.

2. Description of the Related Art

In recent years, a car navigation apparatus has been generalized for displaying a map on a display, such as a liquid crystal display panel or the like, mounted in a car and then guiding routes where a vehicle travels.

In the conventional car navigation apparatus, a map including outdoor roads, well-know landmarks and the like is usually displayed on the display.

Thus, the above-mentioned guide is not displayed at all, for example, during travelling in an underground parking zone or an multistory parking zone on a ground.

However, the size of the underground parking zone or the overpass parking zone has been increased more and more, in recent years. During travelling such a wide parking zone, for example, there are the problems that a position of an exit is not clear and that a position of a passage to move to another story is not clear.

SUMMARY OF THE INVENTION

The present invention is proposed in view of the above mentioned problems. It is therefore an object of the present invention to provide a navigation apparatus that even in a building in which a car may run, can carry out a guide corresponding to an inner structure of the building, and an information recording medium containing a navigation program readable by a computer.

The above object of the present invention can be achieved by a navigation apparatus of the present invention. The navigation apparatus is provided with: a current position determining device for determining whether or not a current position of a movable body is located in a building; a displaying device for displaying building information in relation to the building if the current position is located in the building; and a processing device for carrying out a navigation process by using the displayed building information.

According to the present invention, a navigation process is carried out under the display of the building information. Thus, in a case where the movable body is moving in the building, a guide for the movable body can be properly carried out.

In one aspect of the present invention, the building information is provided for each story of the building. The current position determining device has a story determining device for determining which story the current position belongs to. Then, the displaying device displays the building information corresponding to the story to which the current position belongs.

According to this aspect, even in a case where the movable body is moving to any story in the building, the guide for the movable body can be carried out.

In another aspect of the present invention, the story determining device is further provided with: an upward/downward movement determining device for determining whether the movable body is moving in a ascending direction or a descending direction; and a distance detecting device for detecting a movement distance. The story determining device determines the story to which the current position belongs, in accordance with the movement distance detected by the distance detecting device and a movement state detected by the upward/downward movement determining device.

According to this aspect, a story currently being located is determined in accordance with an upwardly or downwardly moving state and a movement distance. Thus, the story can be determined accurately and quickly.

In another aspect of the present invention, the building information is a drawing indicating the inside of the building corresponding to the building information.

According to this aspect, the navigation process is done under the display of the drawing. Thus, the guide in the building can be done further accurately.

In another aspect of the present invention, the displaying device displays the current position on the drawing.

According to this aspect, the information is also displayed together with the current position. Thus, the guide can be done at an easily recognizable state.

In another aspect of the present invention, when a movement of the movable body is stopped, the stop position is guided.

According to this aspect, when the movement is stopped, the guide is done until its stop position. Thus, the guide can be done further accurately.

In another aspect of the present invention, facility information in the building is guided.

According to this aspect, the information is also displayed together with the facility information. Thus, the guide can be done at an easily recognizable state.

In another aspect of the present invention, the displaying device displays a map if it is determined that the current position is not located in the building, and the processing device uses the displayed map to carry out the navigation process.

According to this aspect, even if the movable body moves from an inside of the building to an outside of the building, the navigation process can be continued by using the map.

In another aspect of the present invention, the building is a parking zone. The navigation apparatus is further provided with: a time detecting device for detecting an entry time when the movable body enters the parking zone; a memory for storing a fee per unit time in the parking zone; a parking time calculating device for calculating a parking time in the parking zone in accordance with the time the movable body goes out from the parking zone and the entry time when the movable body goes out from the parking zone; a parking fee calculating device for calculating a parking fee in accordance with the calculated parking time and the fee per unit time in the parking zone; and a reporting device for reporting the calculated parking fee.

According to this aspect, a usage fee of the parking zone can be recognized in advance. Thus, the convenience as the navigation apparatus can be further improved.

The above object of the present invention can be achieved by an information recording medium of the present invention. In the information recording medium, a navigation program is readably recorded by a computer included in a navigation apparatus. The navigation program causes the computer to function as navigation processing devices which is provided with: a current position determining device for determining whether or not a current position of a movable body is located in a building; a displaying device for displaying building information in relation to the building if the current position is located in the building; and a processing device for carrying out a navigation process by using the displayed building information.

According to the present invention, the computer can function so as to carry out the navigation process under the display of the building information. Thus, in a case where the movable body is moving in the building, the guide can be properly done.

In one aspect of the present invention, the building information is stored the information recording medium as drawing data indicating the inside of each story in the building. The navigation program causes the computer to function as navigation processing devices which is further provided with: an extracting device for extracting the drawing data from the information recording medium; a displaying device for displaying a drawing indicating the inside of each story in the building corresponding to the drawing data; and a processing device for carrying out a navigation process by using the displayed inner drawing.

According to this aspect, the computer can function so as to execute the navigation process under the display of the drawing. Thus, in a case where the movable body is moving in the building, the guide can be done.

In another aspect of the present invention, the drawing data at least includes: a slant data for use of determining whether or not the movable body is moving in a portion between stories; and a story number data indicative of the number of a story to which the drawing data corresponds. The navigation program causes the computer to function as navigation processing devices which is further provided with a processing device for carrying out a navigation process by using the slant data and the story number data.

According to this aspect, a slant data and a story number data are used to execute the navigation process. Thus, the guide can be carried out further accurately.

In another aspect of the present invention, the drawing data includes information with regard to a facility located in a story to which the drawing data corresponds, indicated as at least one of a picture and a character. The navigation program causes the computer to function as navigation processing devices which is further provided with a displaying device for displaying the information with regard to the facility by using at least one of a picture and a character.

According to this aspect, the guide in the building is executed while the information with regard to the facility is displayed by using the picture or character. Thus, the guide can be carried out further intelligibly.

In another aspect of the present invention, the building is a parking zone. Further, navigation processing data is stored in the information recording medium the data is provided with: an exit data for indicating a position of an exit in the parking zone; an entrance data for indicating a position of an entrancet in the parking zone; and a fee data for indicating a fee per unit time in the parking zone. The navigation program causes the computer to function as navigation processing devices which is further provided with: a parking time calculating device for calculating parking time in the parking zone by using the entrance data and exit data; a, fee calculating device for calculating a usage fee in the parking zone by using the calculated parking time and the fee data; and a reporting device for reporting the fee data.

According to this aspect, a usage fee of the parking zone can be recognized in advance. Thus, the convenience as the navigation apparatus can be further improved.

DESCRIPTION OF THE PREFERRED EMBODIMENT

A preferred embodiment of the present invention will be explained below with reference to the drawings.

By the way, the following embodiment is the embodiment in which the present invention is applied to a car navigation apparatus for guiding routes where a vehicle travels while displaying a map.

At first, the configuration and the schematic operation of the navigation apparatus according to the embodiment is described with reference to FIGS. 1 to 3.

Figure 1:
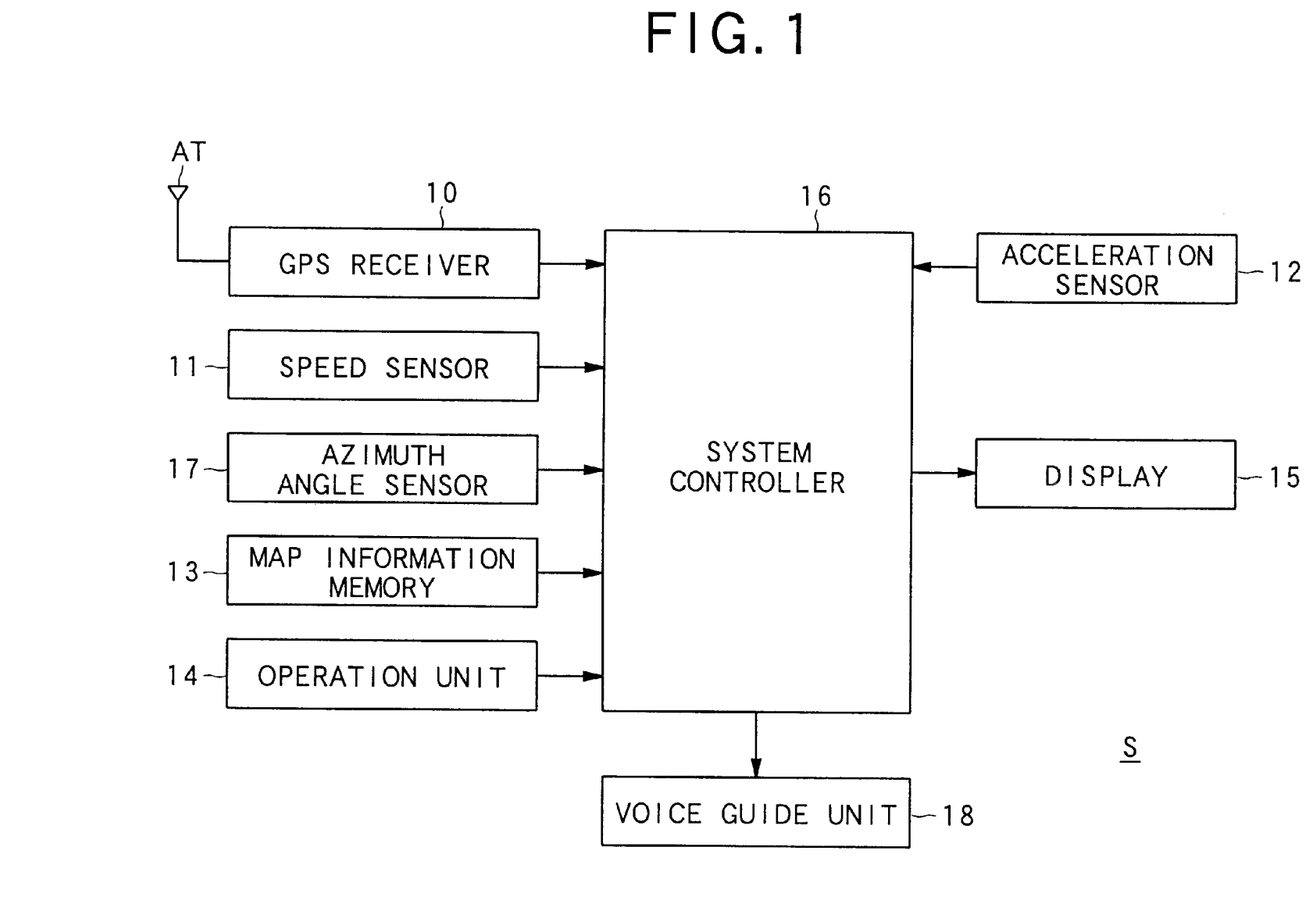
FIG. 1 is a block diagram showing a schematic configuration of a navigation apparatus in a preferable embodiment.

FIG. 1 is a block diagram showing the schematic configuration of the navigation apparatus according to the embodiment. FIGS. 2, 3A and 3B are concept views showing a map information used in a navigation process according to the embodiment.

As shown in FIG. 1, a navigation apparatus S according to the embodiment is provided with: a GPS (Global Positioning System) receiver 10; a speed sensor 11 serving as a distance detecting device; an acceleration sensor 12 serving as an upward/downward movement determining device; a map information memory 13 serving as a memory; an operation unit 14; a display 15 serving as a displaying device; a system controller 16 serving as a time detecting device, a parking time calculating device, a parking fee calculating device, a current position determining device, a story determining device and a processing device; an azimuth angle sensor 17; and a voice guide unit 18 serving as a reporting device.

The schematic operation will be described below.

The GPS receiver 10 receives a navigation electric wave through an antenna AT from a plurality of space satellites belonging to GPS, and calculates a pseudo coordinate value with regard to a current position, and then outputs as a GPS data to the system controller 16.

The speed sensor 11 senses a travel speed of the vehicle, and converts the sensed speed into a speed data having a form of a pulse or a voltage, and then outputs to the system controller 16.

The azimuth angle sensor 17 is constituted by a gyro sensor, and senses an azimuth angle of the car, namely, a travel direction in which the vehicle is running, and converts the sensed azimuth angle into an azimuth angle data having a form of a pulse or a voltage, and then outputs it to the system controller 16.

The acceleration sensor 12 compares a gravitational acceleration with an acceleration generated by a movement of the car, and senses a movement state of the vehicle in an upward direction and a downward direction, and converts an acceleration data indicative of the sensed movement state into a form of a pulse or a voltage, and then outputs it to the system controller 16.

The map information memory 13 readably stores a map information, such as a road map including an inner plan view of a parking zone stored under a later-described manner and the like, and an additional information necessary for guiding routes where the vehicle travels. Specifically, it is constituted by, for example, a DVD drive for reading out the map information and the like from a DVD-ROM (DVD-Read Only Memory) storing the map information and the additional information.

The operation unit 14 is composed of a remote controller containing various check buttons and many keys such as numeral keys and the like. It receives a command from a driver. For example, the driver indicates a display of information about traveling of the vehicle through the operation unit 14.

The display 15 displays the map information outputted by the map information memory 13 and the various states necessary for guiding the routes where the vehicle travels in the navigation apparatus S and the like.

The voice guide unit 18 outputs the travel route guide information in a voice manner. The travel route guide information includes an information to be directly reported to the driver when the guiding is performed, such as a travel direction of the car at a next crossing, and a traffic jam information or a traffic stop information and the like.

In parallel to those operations, the system controller 16 contains various input and output ports (for example, a GPS reception port, a key input port, a display control port and the like), and collectively controls the entire functions for the navigation process. Then, it controls so as to display the travel route guide information on a map of the display 15, which indicates a periphery including the current position of the vehicle, in accordance with a travel information (a position data and a speed data of the vehicle) obtained from a position calculating device (not shown), and also controls so as to output the travel route guide information and the like as voice from the voice guide unit 18.

The position calculating device calculates a plurality of current pseudo positions of the vehicle, in accordance with the speed data and the azimuth angle data outputted by the speed sensor 11 and the azimuth angle sensor 17, respectively. Also, the position calculating device compares the pseudo coordinate value corresponding to the current position outputted by the GPS receiver 10 with one of the calculated current pseudo positions, and calculates a display position of a position mark indicative of the current position of the vehicle on the map to be displayed on the display 15. Moreover, the position calculating device calculates a travel information, such as a speed of the vehicle, a travel direction of the vehicle and the like besides the current pseudo position. The position calculating device may be mounted inside or outside the system controller 16.

The navigation apparatus S in the embodiment has the acceleration sensor 12. Thus, the position calculating device calculates the current pseudo position of the vehicle while determining a slant of a road and an altitude difference of a road, by using the acceleration data sensed by the acceleration sensor 12.

Thus, the current position of the vehicle can be accurately calculated even in an overhead crossing or in a place in which a typical road and an elevated expressway two-dimensionally overlap with each other in which the calculation is difficult only by using the respective data from the azimuth angle sensor 17 and the speed sensor 11 to sense a two-dimension position. Moreover, when the vehicle is running on a mountain road or a sloping road, the usage of the sensed slant of the road enables the compensation for an error between an actual travel distance of the vehicle and a movement distance on a map, which results from the calculation of the current position, in accordance with the respective data from the speed sensor 11 and the azimuth angle sensor 17. In short, the travel distance in the movement on the slant road is longer than the movement distance on a flat map. Thus, the error is induced. However, it is possible to compensate for the error by sensing the slant of the road.

The storing state of the inner plan view of the parking zone according to the embodiment in the map information stored in the map information memory 13 will be described below with reference to FIGS. 2 and 3.

In addition to the conventional road data indicative of an outdoor data, the map information memory 13 in the embodiment includes a passage data indicative of a passage in a parking zone outside the road on a plane and a plan view of the parking zone.

Figure 2:
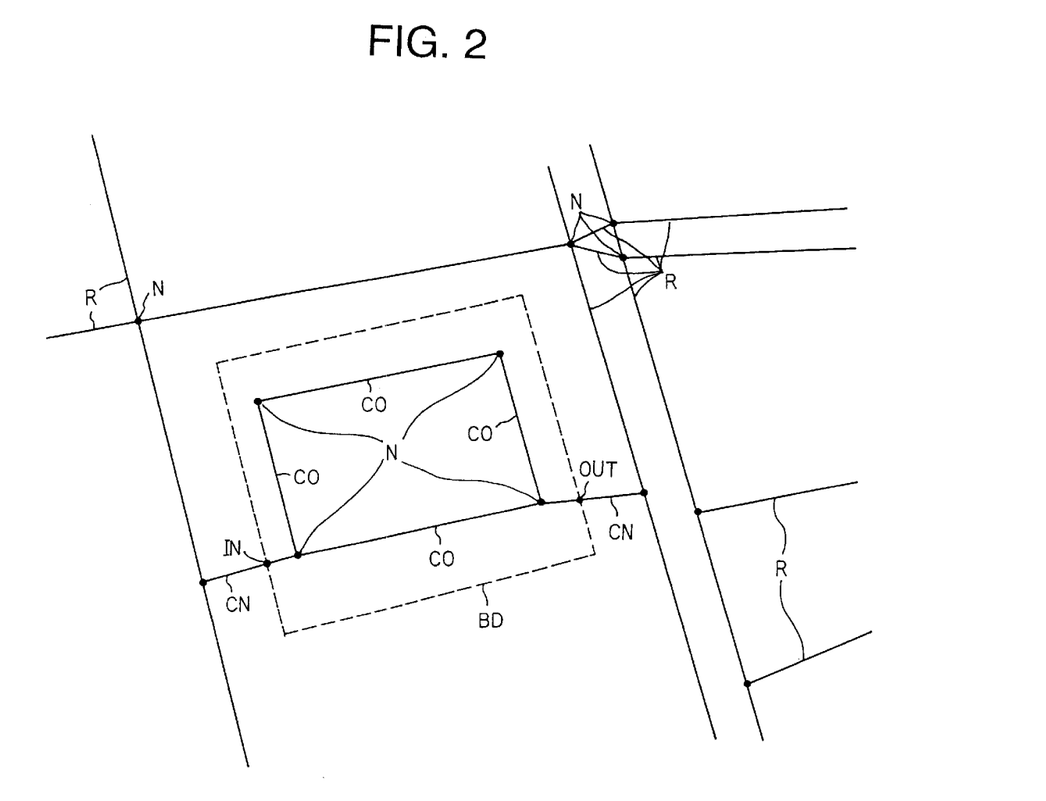
FIG. 2 is a concept view (I) showing a road data in the embodiment.

Specifically, as shown in FIG. 2, as for the typical outdoor road, a passage data R indicative of it is set such that a node N located at its bending point is connected by using a line corresponding to a distance between bending points.

In addition, as for a passage in the parking zone, a passage data CO indicative of it is set such that a node N located at its bending point is connected by using a line corresponding to a distance between bending points. Moreover, the position coordinate of an intersection of a connection passage data CN indicative of a connection passage between the road and the passage in the parking zone and a block data BD indicative of a two-dimensional range of the entire parking zone is set with regard to the passage data R indicative of the outdoor road. For example, in the example of FIG. 2, the position coordinates of an entrance data IN indicative of a position of an entrance to enter the parking zone from the outdoor road and an exit data OUT indicative of a position of an exit to go out from the parking zone is set.

If the parking zone is a so-called ground or underground overpass parking zone containing a plurality of stories, a movement passage data SL indicative of a movement passage to each story is set such that a node located at its bending point is connected by using a line corresponding to a distance between bending points, in addition to the passage data CO.

Figure 3A:
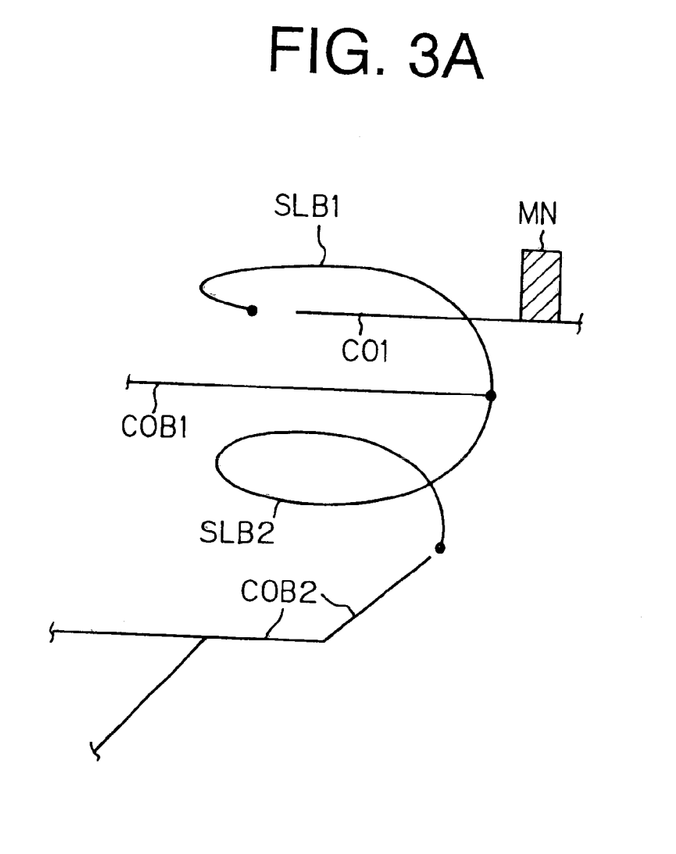
FIG. 3A is a concept view (II) showing a road data in the embodiment.

Specifically, for example, in a case of an underground parking zone with one story above ground and two stories under the ground, a passage data COB1 indicative of a passage to a first story under the ground and a passage data COB2 indicative of a passage to a second story under the ground are set in addition to a passage data CO1 indicative of a passage to a first story in which a tollgate MN is disposed, as shown in FIG. 3A. Also, a movement passage data SLB1 indicative of a movement passage from the first story above the ground to the first story under the ground and a movement passage data SLB2 indicative of a movement passage from the first story under the ground to the second story under the ground are set under a condition that those passage data are three-dimensionally connected to each other.

Figure 3B:
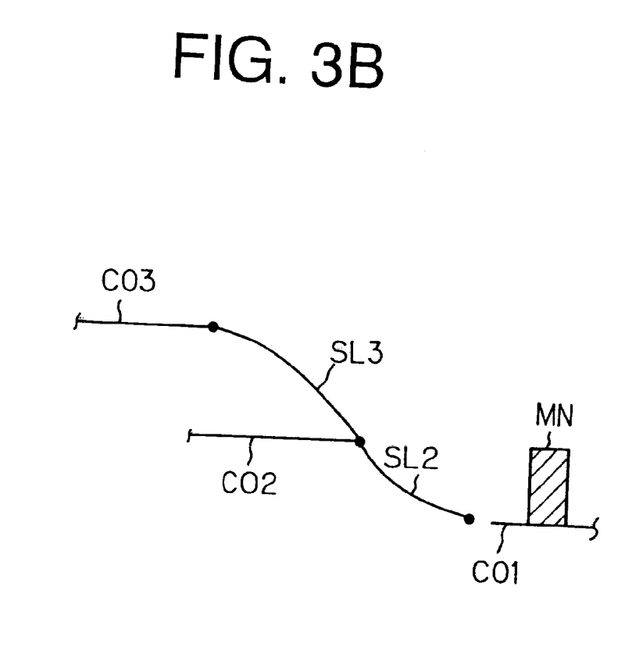
FIG. 3B is a concept view (II) showing a road data in the embodiment.

In a case of a three-dimensional parking zone with three stories above the ground, a passage data CO2 indicative of a passage to a second story and a passage data CO3 indicative of a passage to a third story are set in addition to a passage data CO1 indicative of a passage to a first story in which a tollgate MN is disposed, as shown in FIG. 3B. Also, a movement passage data SL2 indicative of a movement passage from the first story to the second story and a movement passage data SL3 indicative of a movement passage from the second story to the third story are set under a condition that those passage data are three-dimensionally connected to each other.

A story number data indicative of a number of a story to which the passage belongs is appendant to the passage data CO indicative of the passage to each story in the respective parking zones.

Moreover, a movement passage data SL indicative of a movement passage for connecting the adjacent stories in the respective cubic parking zones to each other is accompanied with a story number data indicative of a number of a story having an entrance to the movement passage, a story number data indicative of a number of a story having an exit from the movement passage and a slant data indicative of a slant of the movement passage.

A plan view data indicative of a plan view of the parking zone includes a name data indicative of the parking zone, a story number data indicative of each story, a plan view data overlooking each story as a whole, a parking area data indicative of a position of a parking area in each story, a travel direction data indicative of a travel direction on a passage, a division line data indicative of a division line in each parking area, a position data indicative of positions of a lavatory and an elevator in each story, a building data indicative of a pole and a wall constituting each story, an exit position data indicative of a position for a pedestrian exit in the story, a tollgate data indicative of a position in each story of a tollgate (including a pre-fare-adjuster and the like), for each story in the parking zone, in the condition correlated to the above-mentioned passage data CO.

In addition to them, the map information memory 13 also stores a usage fee data indicative of a usage fee per unit time in each parking zone as a map information.

The navigation process according to the embodiment executed by using the above-mentioned map information and the like will be described below with reference to FIGS. 4 to 9.

Figure 4:
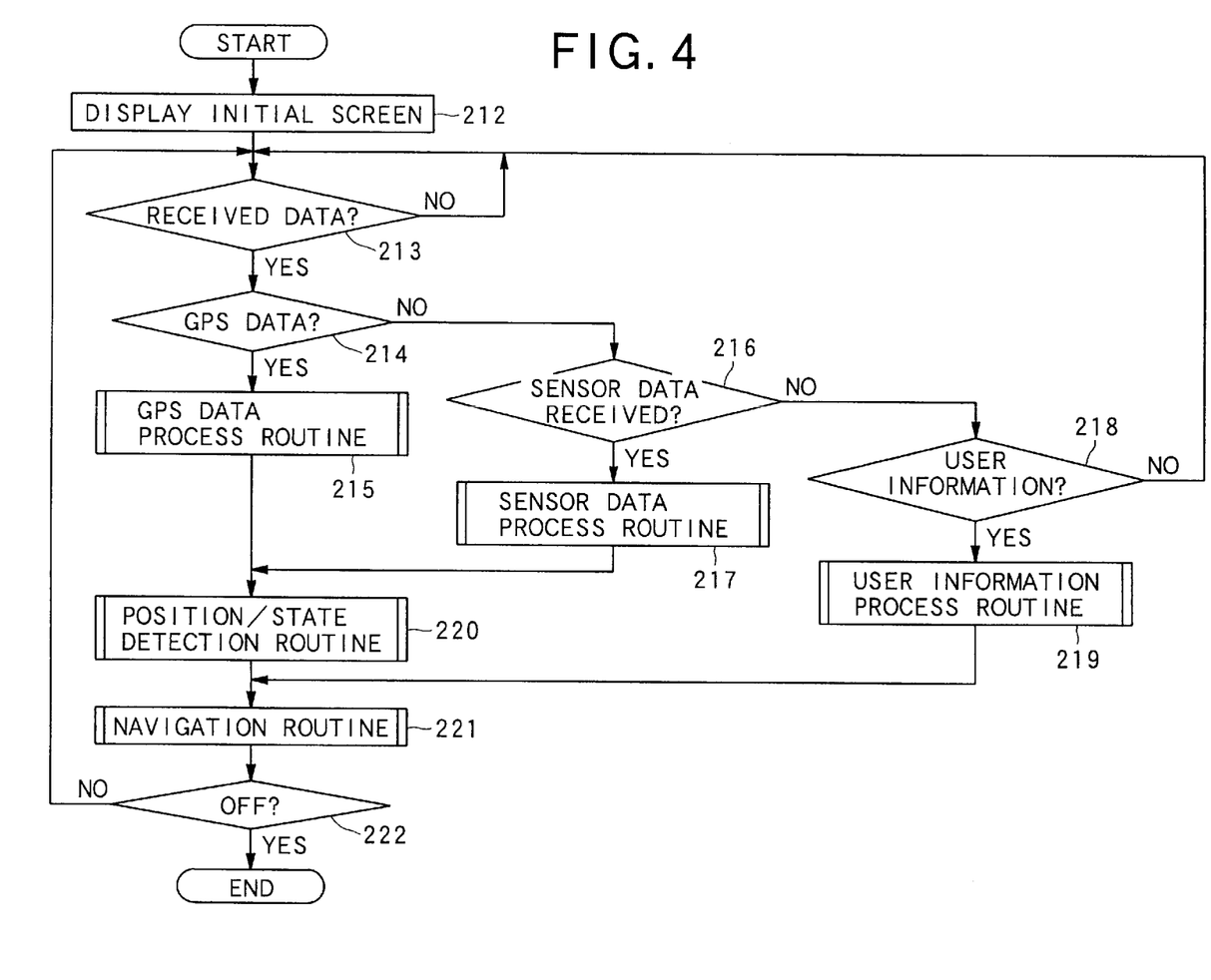
FIG. 4 is a flowchart showing an entire navigation process in the embodiment.
Figure 5:
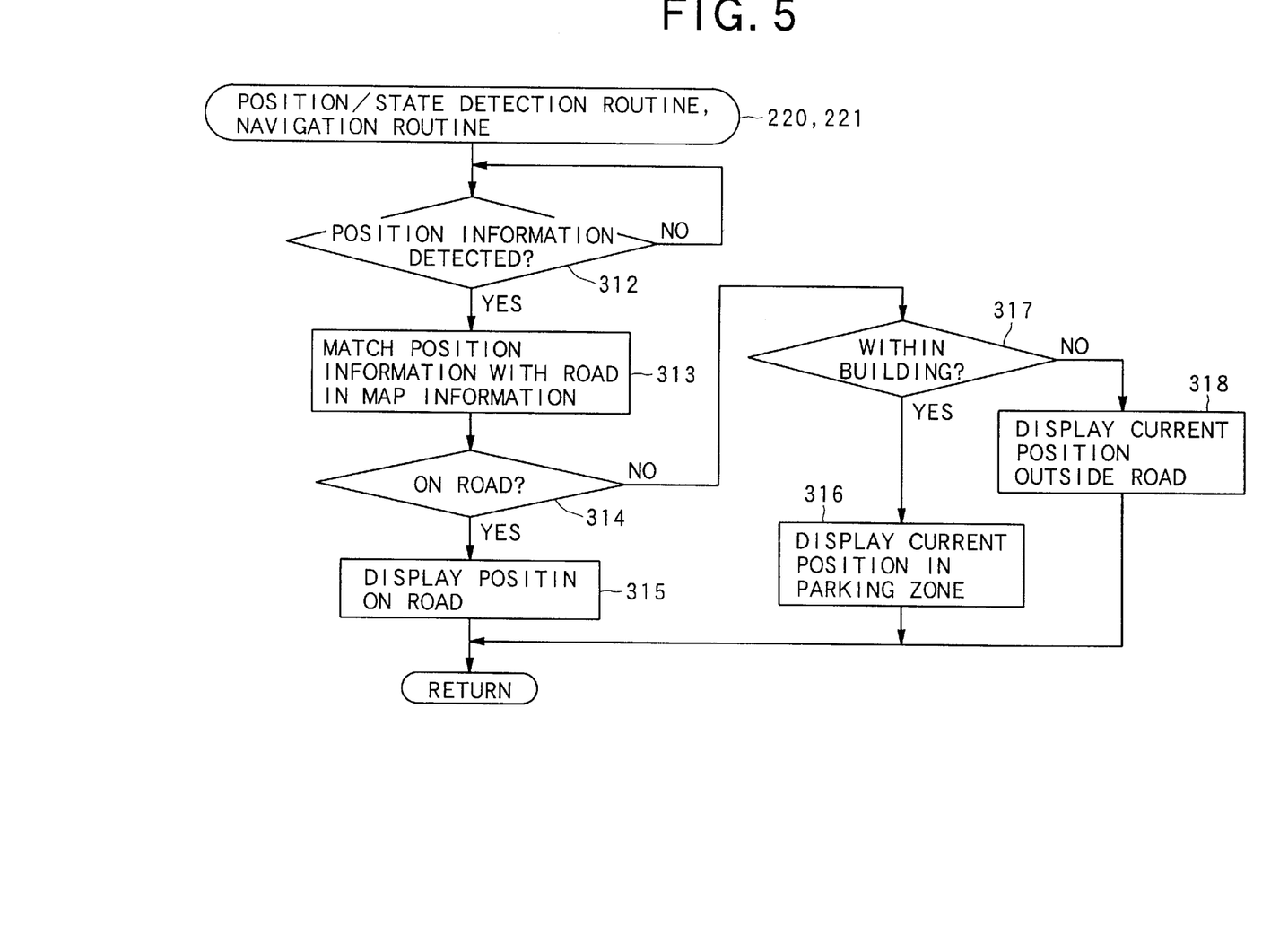
FIG. 5 is a flowchart showing a position/state detection routine and a navigation routine in the embodiment.
Figure 6:
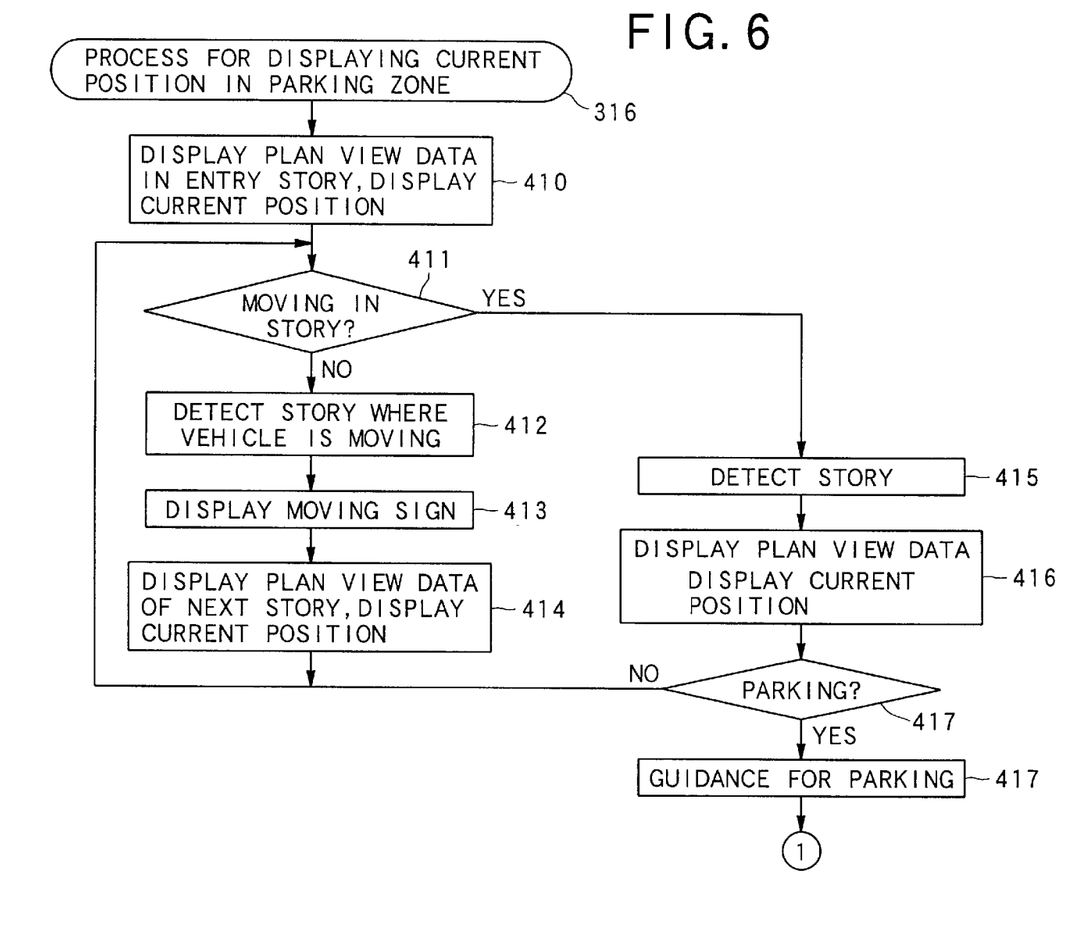
FIG. 6 is a flowchart (I) showing a process for displaying a current position in a parking zone in the embodiment.
Figure 7:
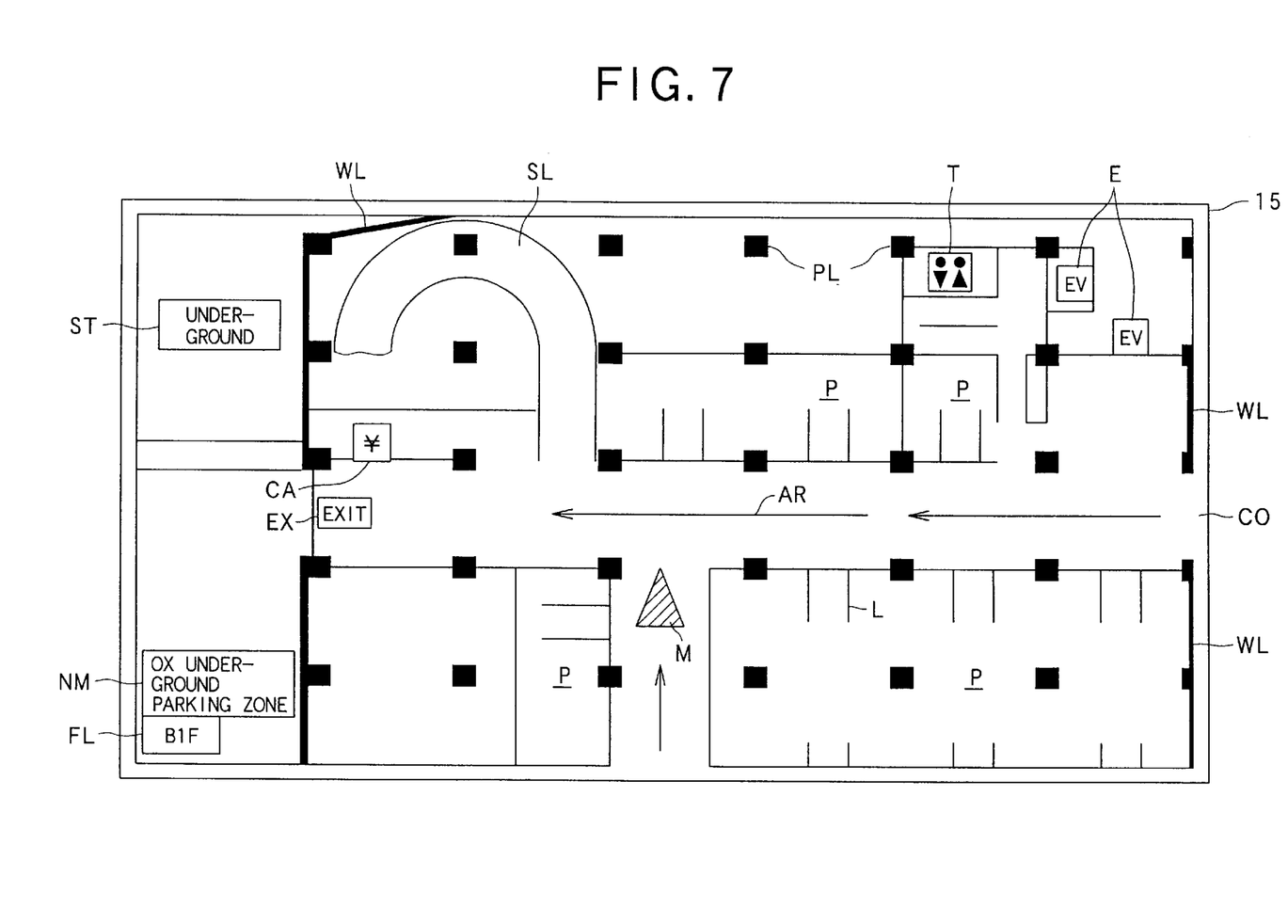
FIG. 7 is a view exemplifying a plan view of a story to be displayed.
Figure 8:
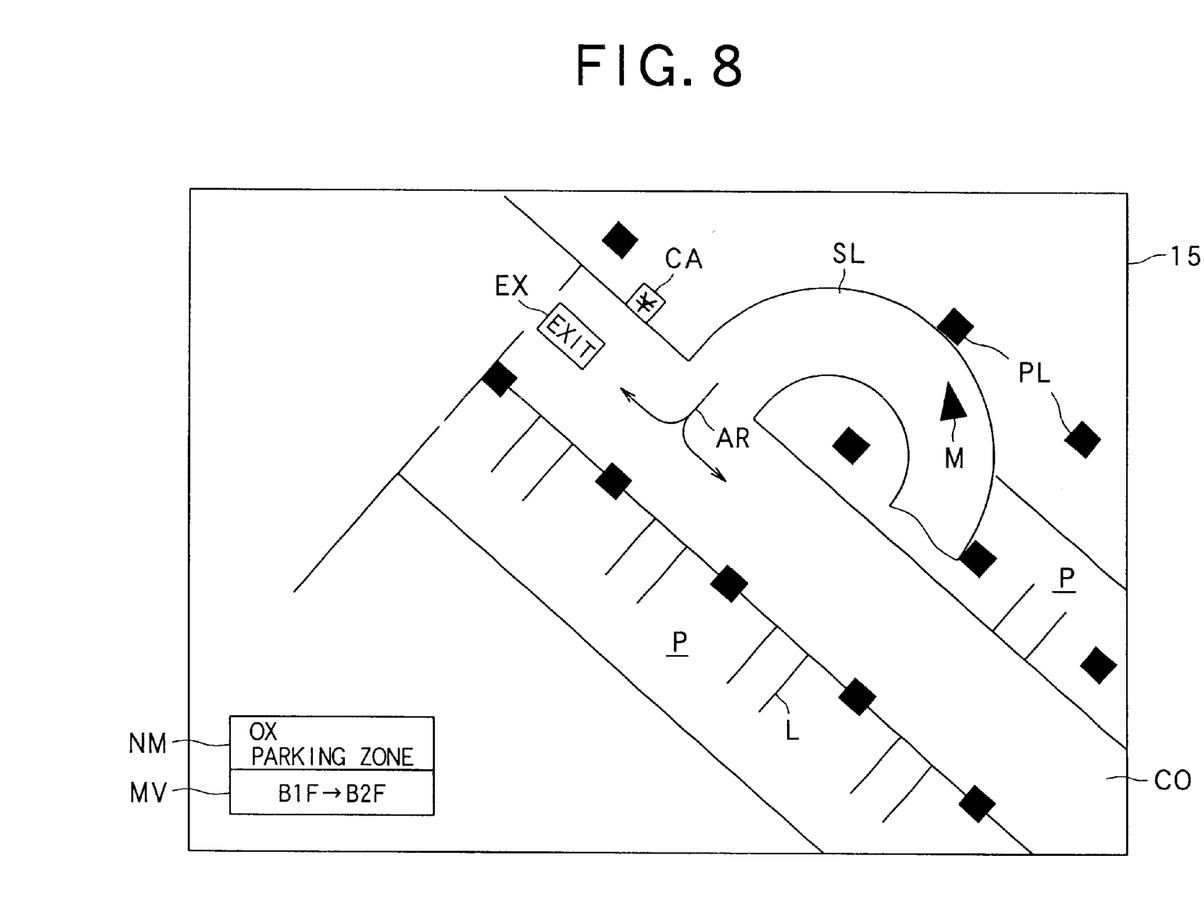
FIG. 8 is a view exemplifying a plan view during traveling to be displayed.
Figure 9:
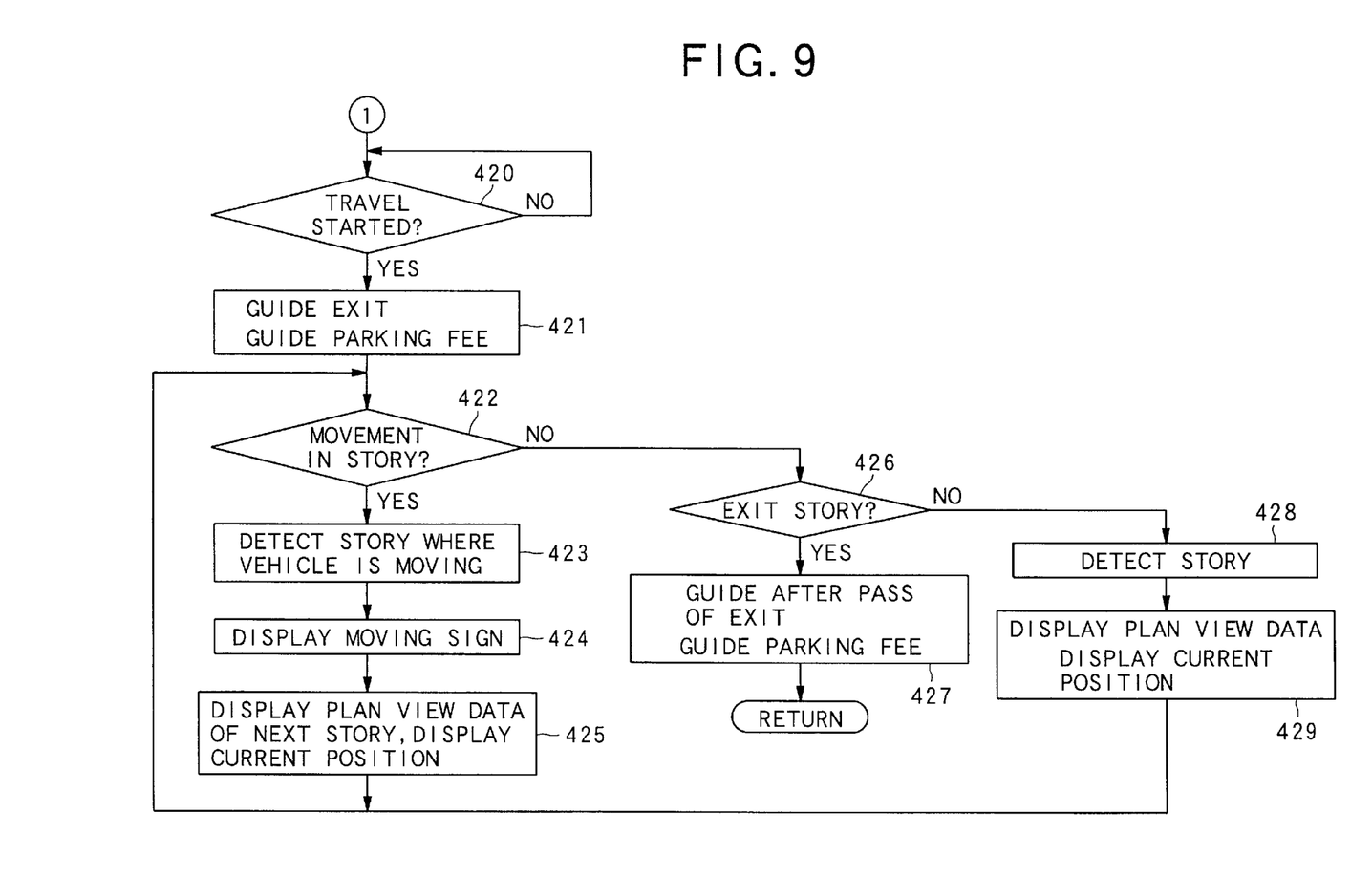
FIG. 9 is a flowchart (II) showing a process for displaying a current position in a parking zone in the embodiment.

FIG. 4 is a flowchart showing the entire navigation process. FIG. 5 is a flowchart showing a position/state detection routine and the like. FIG. 6 is a flowchart (I) showing a process for displaying a current position in a parking zone. FIGS. 7, 8 are views showing examples of a position display in the parking zone. And, FIG. 9 is a flowchart (II) showing a process for displaying a current position in the parking zone.

Also, the navigation processes indicated by the flowcharts shown in FIGS. 4 to 6 and 9 are mainly executed with the system controller 16 as a center.

At first, the whole configuration of the navigation process is described with reference to FIG. 4.

As shown in FIG. 4, in the navigation process in the embodiment, when a power supply of the navigation apparatus S itself is firstly turned on, the system controller 16 supplies the power supply to the respective sensors and the like. Then, it initializes an information record region of the map information memory 13, and displays an initial screen of the navigation system on the display 15 (Step 212).

Then, it is determined whether or not the GPS data, the speed data, the azimuth angle data or the acceleration data, or the user information is inputted from the operation unit 14 (Step 213). If any data is not inputted (Step 213; NO), the processing waits for its input. On the other hand, if any of the data is inputted (Step 213; YES), it is determined whether or not the input data is the GPS data (Step 214).

If it is the GPS data (Step 214; YES), the system controller 16 executes a GPS data process routine including an analysis of a content of the GPS data and the like (Step 215).

On the other hand, if it is determined at the step 214 that the input data is not the GPS data (Step 214; NO), it is determined whether or not the input data is the sensor data from each sensor (Step 216).

If the input data is the sensor data (Step 216; YES), the system controller 16 executes a sensor data process routine including an analysis of the sensor data and the like (Step 217).

After that, at the step 220, a position/state detection routine is executed for detecting the position information by using the execution result of the GPS data process routine, the execution result of the sensor data process routine and the other necessary data are used to calculate the current position and the current state of the vehicle. This position/state detection routine will be described later in detail.

If it is determined at the step 216 that the input data is not the sensor data (Step 216; NO), it is determined whether or not the input data is the user information (Step 218).

If the input data is not the user information (Step 218; NO), the processing returns back to the step 213, and waits for an input of a next data. On the other hand, if the input data is the user information (Step 218; YES), the system controller 16 executes a user information process routine including an analysis of a content of the input user information and the like (Step 219).

By the way, the information inputted to the system controller 16 in accordance with the respective process routine (the GPS data process routine, the sensor data process routine and the user information process routine) may be respectively individually processed, or may be used by coupling the two or more data to each other.

Next, the system controller 16 executes the navigation routine for guiding the vehicle by using the position information (refer to the step 220) and the user information (refer to the step 219) which are calculated as mentioned above, and the other recorded information and the like (Step S221).

Specifically, it includes a process for displaying a current position together with a map containing the current position, a process for displaying a traffic jam situation of a travel destination, a process for displaying a route to a preset destination place, a process for displaying a time required to arrive at the destination place and the like.

It is always monitored whether or not the power supply of the navigation apparatus S itself is turned off during the execution of the navigation routine (Step 222). If it is turned off (Step 222; YES), the navigation process is ended in its original state. On the other hand, if it is not turned off (Step 222; NO), the processing returns back to the step 213, in order to repeat the above-mentioned series of the navigation processes.

The process for displaying a current position, according to the embodiment in the navigation routine, will be described below in detail with reference to FIG. 5.

By the way, in FIG. 5, only the portion in relation to the process for displaying a current position is extracted from the position/state detection routine (step 220) and the navigation routine (step 221).

As shown in FIG. 5, in the process for displaying the current position in the embodiment, the position calculator in the system controller 16 firstly uses the GPS data, the speed data, the azimuth angle data and the acceleration data, and calculates the current position and the current state of the vehicle, and accordingly determines whether or not the position information is obtained (Step 312).

If the position information is not obtained (Step 312; NO), the position calculation is repeated until it is obtained. On the other hand, if it is obtained (Step 312; YES), the system controller 16 calculates a territory in a map to which the current position belongs by using the obtained position information, and then executes a map mapping process to a road in the map information stored in the map information memory 13. Then, it displays a position state of the vehicle including the current position, on the display 15 (Step 313). Specifically, the information of positions of adjacent facilities and the like are displayed in addition to the current position.

Next, it is determined whether or not the displayed current position is located on an outdoor road (Step 314). If it is located on the outdoor road (Step 314; YES), the current position is displayed on the road (Step 315). The processing returns back to the step 222 of FIG. 4.

On the other hand, if the current position is not located on the outdoor road (Step 314; NO), it is determined whether or not the vehicle enters a building stored in the map information memory 13, as a building information according to the present invention, such as a parking zone and the like (Step 317).

Whether or not the vehicle enters the parking zone is determined by comparing the connection passage data CN and the entrance data IN shown in FIG. 2 with the calculated car position information.

When the parking zone is an indoor parking zone, if the GPS data can not be obtained because of a shield and the like, only the speed data, the azimuth angle data and the acceleration data are used to accordingly calculate the position information including the current position.

If the vehicle does not enter the parking zone (Step 317; NO), the current position is located in an outdoor place except the road. Thus, the calculated current position is displayed at a position except the road on the displayed map without executing the map mapping process (Step 318). The processing returns back to the step 222.

On the other hand, if it is determined at the step 317 that the vehicle enters the parking zone (Step 317; YES), the process for displaying the current position in the parking zone according to the present invention is carried out (Step 316). Then, the processing returns back to the step 222.

The process for displaying a current position in a parking zone according to the present invention to be executed as the step 316 will be described below with reference to FIGS. 6 to 9.

When the processing proceeds to the step 316, it is firstly checked whether or not the entered parking zone is any of the parking zones. Also, a time when the vehicle enters the parking zone is stored in a non-volatile memory (not shown) in the system controller 16. Moreover, it is switched from the display of the current position on the road executed at the step 313 of FIG. 5 to a display of a plan view indicative of an entered story in the entered parking zone (Step 410). For example, if a first story portion in the parking zone is connected to an external road, a plan view of the first story portion is displayed. Moreover, a position mark indicative of the current position of the car is displayed on the plan view.

Next, it is determined whether or not the vehicle exists on a passage to the entered story, or whether or not the vehicle enters the movement passage to move from the entered story to another story (Step 411).

Whether or not the vehicle enters the movement passage can be recognized by a fact as to whether or not a slant in a front and rear direction of the vehicle indicated by the acceleration data is detected.

If it is determined at the step 411 that the vehicle does not exist on the passage (Step 411; YES), a story in which the vehicle is running is determined from the story number data of the story to which the passage belongs (Step 415). A plan view data of the determined story is read out from the map information memory 13, and the corresponding plan view is displayed. Moreover, the current position of the vehicle is displayed on the plan view (Step 416).

Here, an example of the plan view displayed at the step 416 is described with reference to FIG. 7.

As mentioned above, the name data indicative of the parking zone and the like are stored in the map information memory 13, for each story of the parking zone. Thus, as the plan view, as shown in FIG. 7, a parking area P using the parking area data, a passage based on the passage data CO, a travel direction indication AR using the travel direction data, a division line L using the division line data, an elevator mark E and a lavatory mark T using the position data, a pole mark PL and a wall mark WL using the building data, a tollgate mark CA using the tollgate data, a name display NM using the name data, an exit mark EX using the outlet position data and a story number display FL using the story number data are displayed in a region to divide the entire story using the plan view data, on the display 15, together with the position mark M and the state display ST indicative of the vehicle position state.

Next, in the condition that the plan view of the story in which the vehicle exists and the position mark M are displayed, whether or not the vehicle is parked is always monitored by monitoring whether or not the vehicle enters the parking area P, whether or not a parking brake within the vehicle is set, or whether or not an engine of the vehicle is stopped (Step 417).

If it is determined that the vehicle is parked (Step 417; YES), an actual parking position is reported. Specifically, for example, a voice is outputted such as "Parking Position Is A-1". Or, information with regard to a walk passage is reported. For example, a voice is outputted such as "Elevator Is Located In Left Direction". The guide to be indicated in such a parking is executed (Step 418). Then, the processing proceeds to that shown in FIG. 9.

On the other hand, if it is determined at the step 417 that the vehicle is not still parked (Step 417; NO), the processing returns back to the step 411, in order to perform the above-mentioned process for displaying the current position, on the vehicle at the movement state.

If it is determined at the step 411 that the car is inclined in the front and rear direction and that the vehicle enters the movement passage from the enter story to another story (Step 411; NO), the story number data appendant to the entered movement passage is used to detect a portion between stories in which the vehicle is running (Step 412). Specifically, a story number data indicative of a story of a connection source and a story number data indicative of a story of a connection destination are used. Also, the current position of the vehicle in the movement passage is calculated by comparing the distance data with the movement passage data SLB1 and the like. So, a movement display is carried out for indicating that the vehicle is moving on the movement passage (Step 413). Moreover, a plan view of a story of a connection destination is displayed which is indicated by the story number data contingent to the movement passage data during the movement of the vehicle (Step 414). After that, the processing returns back to the step 411, and the above-mentioned processes are repeated for the story of the connection destination.

Here, an example of the plan view displayed at the steps 413, 414 is described with reference to FIG. 8.

During the movement, the name data stored in the map information memory 13 and the like are used to display the pole mark PL, the tollgate mark CA, the exit mark EX, the parking area P, the division line L, the travel direction indication AR, the name display NM, the passage based on the passage data CO, the movement story display MV indicative of the story under the movement, and the movement passage between the stories using the movement passage data SL are displayed on the display 15, as shown in FIG. 8, as the plan view under the movement. Also, the position mark M is displayed on the movement passage.

The process for displaying the current position in the parking zone after the vehicle is once parked is described with reference to FIG. 9.

As shown in FIG. 9, whether or not the travel of the vehicle is started is determined by always monitoring whether or not the engine is set after the vehicle is parked in the parking area (Step 420).

If the travel is not started (Step 420; NO), the processing waits in its original state. On the other hand, if the travel is started (Step 420; YES), it is determined that the vehicle tries to go out from the parking zone. So, a direction of an exit is reported. Moreover, a parking fee to be paid when the vehicle goes out from the parking zone is calculated and reported in accordance with an entry time stored in the non-volatile memory and a usage fee data indicative of a usage fee per unit time of the parking zone stored in the map information memory 13 (Step 421).

Next, a process for determining a travel in a story (Step 422) similar to the process for determining a travel in a story (Step 411) shown in FIG. 6 is executed. As a result, if it is determined that the vehicle is moving between stories (Step S422; NO), a process for detecting a story during a movement (Step 423), a process for displaying a movement (Step 424) and a process for displaying a plan view of a story of a movement destination (Step 425) are executed respectively similar to the process for detecting a story during a movement (Step 412), the process for displaying a movement (Step 413) and the process for displaying a plan view of a story of a movement destination (Step 414) shown in FIG. 6. Then, the processing returns back to the step 422.

On the other hand, if it is determined at the step 422 that the vehicle is running in the story (Step 424; YES), it is determined whether or not its story is the story in which an exit to go out from the parking zone exists (Step 426).

This determination at the step 426 is performed by comparing the position information of the vehicle with the exit data OUT (refer to FIG. 2).

If the vehicle is running in the story having the exit (Step 426; YES), a parking fee to be paid when the vehicle goes out is again calculated and reported in accordance with that time, the stored entry time and the usage fee data. Also, a process for reporting a travel direction after the vehicle goes out from the exit is executed (Step 427). Moreover, the process for displaying the current position in the parking zone is ended to then switch to the navigation process using the usual road map.

If it is determined at the step 426 that the vehicle is not running in the story having the exit (Step 426; NO), a process for detecting a story (Step 428) and a process for displaying a plan view (Step 429) are executed respectively similar to the process for detecting a story (Step 415) and the process for displaying a plan view (Step 416) shown in FIG. 6. Then, the processing returns back to the step 422, and the above-mentioned processes are repeated.

As mentioned above, according to the process for displaying the current position in the parking zone in the embodiment, if it is determined that the current position of the vehicle is located in the parking zone, the navigation process is carried out under the display of the plan view of the parking zone. Thus, when the vehicle is running in the parking zone, its guide can be done.

The plan view is installed for each story of the parking zone, and the plan view corresponding to the story including the current position is displayed. Thus, even if the vehicle is running in any of the stories in the parking zone, its guide can be done.

Moreover, the story at which the vehicle is located is determined on the basis of the slant state of the vehicle and the movement distance. Thus, the story can be determined accurately and quickly.

Furthermore, the current position of the vehicle is also displayed as the position mark M. Thus, it can be guided at an easily recognizable state.

Also, if it is determined that the current position of the vehicle is not located in the building, the displayed map is used to carry out the navigation process. Thus, even if the vehicle goes out from the building, the map is used to continue the navigation process.

Moreover, the usage fee of the parking zone can be recognized prior to the payment. Thus, it is possible to further improve the convenience as the navigation apparatus S.

By the way, the display of the current position when the vehicle enters the parking zone is described in the above-mentioned embodiment. However, besides it, the present invention can be widely applied to a guide when a vehicle having a certain purpose is running in a typical building.

Also, the case when the plan view of each story in the parking zone is displayed to carry out the navigation process is described in the above-mentioned embodiment. However, besides the case, the present invention can be applied to a case when an inner drawing data having a three-dimension configuration is used to cubically display a condition of a story and then carry out the navigation process.

Moreover, a program corresponding to the above-mentioned navigation process is recorded on an information record medium, such as a flexible disk, a hard disc or the like. Then, this is read out and executed from a note type personal computer or the like. Accordingly, the note type personal computer can be used so as to function as the system controller 16.

Also, a navigation center can be installed in a building. Then, a main process in the navigation process may be carried out in the navigation center while data is sent to and received from a terminal within a vehicle. So, the effect similar to that of the above-mentioned embodiment can be obtained by sending the result of the process to the terminal within the vehicle.

Although the case where the navigation system is employed in the vehicle is explained in the embodiment, the present invention is not limited to this and can be applied to a case where the navigation system which can be utilized in a movable body other than vehicles is employed. For example, a feature can be expected wherein the function of the navigation system in the present embodiments is added to a commonly utilized portable telephone unit.

In addition, the present invention can be applied to a case where each of the navigation system that is connected to the Internet. In this case, a navigation server, the map search server, or the like are employed.

The entire disclosure of Japanese Patent Application No. 2000-131639 filed on Apr. 28, 2000 including the specification, claims, drawings and summary is incorporated herein by reference in its entirety.

What is claimed is:

1. A movable apparatus used by a user in a parking place comprising:
   a detector which detects a present position of the movable apparatus; and
   an informing device which informs the user of the present position of the movable apparatus in the parking place, if the detected present position is in the parking place.

2. The movable apparatus according to claim 1, further comprising:
   an acquiring device which acquires information with regard to an inside of the parking place; and
   a recognizing device which recognizes the present position in the parking place based on the detected present position and the acquired information;
   wherein the informing device informs the user of a parking zone as the present position in the parking place, if the user parks in the parking place.

3. A movable apparatus used by a user in a parking place comprising:
   a detector which detects a present position of the movable apparatus;
   a recognizing device which recognizes a walk passage in the parking place; and
   an informing device which informs the user of information with regard to the walk passage, if the detected present position is in the parking place.

4. The movable apparatus according to claim 3, further comprising:
   an acquiring device which acquires information with regard to an inside of the parking place;
   wherein the recognizing device recognizes the walk passage of surrounding of the present position in the parking place based on the detected present position and the acquired information;
   the informing device informs the user of information with regard to the walk passage, if the user parks in the parking place.

5. A movable apparatus used by a user in a parking place comprising:
   a detector which detects a present position of the movable apparatus;
   a recognizing device which recognizes an elevator's position in the parking place; and
   an informing device which informs the user of the elevator's position, if the detected present position is in the parking place.

6. The movable apparatus according to claim 5, further comprising:
   an acquiring device which acquires information with regard to an inside of the parking place;
   wherein the recognizing device recognizes the elevator's position of surrounding of the present position in the parking place based on the detected present position and the acquired information;
   the informing device informs the user of the elevator's position, if the user parks in the parking place.

7. A movable apparatus used by a user in a parking place comprising:
   a detector which detects a present position of the movable apparatus;
   an recognizing device which recognizes a parking fee of the parking place; and
   an informing device which informs the user of the parking fee, if the detected present position is in the parking place.

8. A method for navigation in a parking place comprising:
   detecting a present position of the movable apparatus; and
   informing the user of the present position of the movable apparatus in the parking place, if the detected present position is in the parking place.

9. A method for navigation in a parking place comprising:
   detecting a present position of the movable apparatus;
   recognizing a walk passage in the parking place; and
   informing the user of information with regard to the walk passage, if the detected present position is in the parking place.

10. A method for navigation in a parking place comprising:
    detecting a present position of the movable apparatus;
    recognizing an elevator's position in the parking place; and
    informing the user of the elevator's position, if the detected present position is in the parking place.

11. A method for navigation in a parking place comprising:
    detecting a present position of the movable apparatus;
    recognizing a parking fee of the parking place; and
    informing the user of the parking fee, if the detected present position is in the parking place.

12. An information recording medium in which a navigation program is readably recorded by a computer included in a navigation apparatus, the navigation program causing the computer to function as navigation processing devices, the navigation processing devices comprising:
    a current position determining device for determining whether or not a current position of a movable body is located in a building;
    a displaying device for displaying building information in relation to the building if the current position is located in the building; and
    a processing device for carrying out a navigation process for guiding the movable body by using the displayed building information.

* * * * *